(12) United States Patent
Leblanc et al.

(10) Patent No.: US 8,150,934 B2
(45) Date of Patent: Apr. 3, 2012

(54) SYSTEM AND METHOD FOR EMBEDDING INTERACTIVE COMPONENTS WITHIN MOBILE CONTENT

(75) Inventors: Michael Leblanc, Fredericton (CA); Jody Glidden, Sterling, VA (US); David James Hudson, Fredericton (CA); Ian Brian Delong, Fredericton (CA); Silvio Verzilli, Fredericton (CA); Jacob Samuel O'Reilly, Fredericton (CA); Michael Derek Waugh, Fredericton (CA)

(73) Assignee: Chalk Media Service Corp., Vancouver, British Columbia (CA)

( * ) Notice: Subject to any disclaimer, the term of this patent is extended or adjusted under 35 U.S.C. 154(b) by 227 days.

(21) Appl. No.: 12/435,247

(22) Filed: May 4, 2009

(65) Prior Publication Data

US 2009/0281874 A1  Nov. 12, 2009

Related U.S. Application Data

(60) Provisional application No. 61/051,138, filed on May 7, 2008, provisional application No. 61/051,084, filed on May 7, 2008, provisional application No. 61/057,954, filed on Jun. 2, 2008.

(51) Int. Cl.
   *G06F 15/16* (2006.01)
(52) U.S. Cl. ........ 709/207; 709/206; 709/217; 370/392; 370/401
(58) Field of Classification Search .................... 709/207
   See application file for complete search history.

(56) References Cited

U.S. PATENT DOCUMENTS

| 2002/0118220 A1* | 8/2002 | Lui et al. ........................ 345/709 |
| 2003/0130864 A1* | 7/2003 | Ho et al. ............................ 705/1 |
| 2004/0267597 A1* | 12/2004 | Kobrosly et al. ............... 705/10 |
| 2005/0277102 A1* | 12/2005 | Gillette et al. ................. 434/350 |
| 2006/0195334 A1* | 8/2006 | Reeb et al. ........................ 705/1 |
| 2007/0168462 A1* | 7/2007 | Grossberg et al. ............ 709/217 |
| 2008/0025307 A1* | 1/2008 | Preiss et al. .................... 370/392 |
| 2008/0275764 A1* | 11/2008 | Wilson et al. ................... 705/10 |
| 2009/0135919 A1* | 5/2009 | Vered et al. ............... 375/240.29 |
| 2010/0049608 A1* | 2/2010 | Grossman ................... 705/14.55 |
| 2010/0179991 A1* | 7/2010 | Lorch et al. .................... 709/206 |
| 2011/0016427 A1* | 1/2011 | Douen ........................... 715/828 |

FOREIGN PATENT DOCUMENTS

| WO | 2006/110005 A1 | 10/2006 |
| WO | 2008/134880 A1 | 11/2008 |

* cited by examiner

Primary Examiner — Brian J Gillis
Assistant Examiner — Tesfay Yohannes
(74) Attorney, Agent, or Firm — Norton Rose Canada LLP

(57) ABSTRACT

A system is provided for providing content including one or more interactive components to a wireless device. The system includes a content server configurable to deliver push content to the wireless device, a processor for controlling operation of the server, a communications subsystem coupled to the processor for communicating with a communications network, and a memory coupled to the processor. The content server includes one or more modules for providing the content to the wireless device, the one or more modules being configured to cause the content server to: receive a content file including the content and information about the one or more interactive components, the information about each individual interactive component comprising one or more attributes useful in rendering the individual interactive component; process the content file and package the processed content file as a content package for delivery to the wireless device; and send the content package to the wireless device as a push delivery.

43 Claims, 6 Drawing Sheets

SYSTEM AND METHOD FOR EMBEDDING INTERACTIVE COMPONENTS WITHIN MOBILE CONTENT

CROSS REFERENCE TO RELATED APPLICATIONS

The present application claims priority to U.S. Provisional Applications Nos. 61/051,138 and 61/051,084 filed May 7, 2008 and U.S. Provisional Application No. 61/057,954 filed Jun. 2, 2008, the entirety of which are hereby incorporated by reference.

The disclosed method and system may operate in conjunction with the inventions described in pending U.S. provisional patent application Ser. No. 61/008,905 entitled A Method and System for Authoring Mobile Content in PowerPoint for Direct Delivery to a Mobile Device, the entirety of which is incorporated herein by reference.

TECHNICAL FIELD

The present disclosure relates generally to portable devices, and more particularly to a system and method for embedding interactive components within mobile content.

BACKGROUND

Mobile content delivery refers to the process whereby content that is developed specifically for a mobile device is pushed or sent to a selected user's mobile device, such as a BlackBerry™. The content is developed, packaged and then sent to a user in a format that allows playback in the mobile device. Mobile content delivery systems, such as those designed to work with Microsoft™ PowerPoint™, are currently available on the market.

Current methods of delivering specialized content to a mobile device do not support interactive components, such as clickable actions. For example, using current methods, PowerPoint™ slides that are delivered to a mobile device as content are either displayed as an image, displayed as plain text or both. If content which allows for user interaction is desired, using current methods, the user is provided with a webpage and the interaction occurs using the interactive functionality of an internet browser. There is no ability for a user to interact with components of the content offline or outside of the context of an internet browser.

BRIEF DESCRIPTION OF THE DRAWINGS

Reference will now be made to the drawings, which show by way of example, embodiments of the present disclosure, and in which.

It will be noted that throughout the appended drawings, like features are identified by like reference numerals.

DETAILED DESCRIPTION

One aspect of the description provides a system for providing content including one or more interactive components to a wireless device, the system comprising: a content server configurable to deliver push content to the wireless device; a processor for controlling operation of the server; a communications subsystem coupled to the processor for communicating with a communications network; and a memory coupled to the processor; the content server including one or more modules for providing the content to the wireless device, the one or more modules being configured to cause the content server to: receive a content file including the content and information about the one or more interactive components, the information about each individual interactive component comprising one or more attributes useful in rendering the individual interactive component; process the content file and package the processed content file as a content package for delivery to the wireless device; and send the content package to the wireless device as a push delivery.

Another aspect of the description provides a wireless device comprising: a processor for controlling operation of the wireless device; at least one input device coupled to the processor for accepting input from a user; at least one display device coupled to the processor for communicating an output to the user; a communications subsystem coupled to the processor for communicating with a communications network, the communications network including at least one content server configurable for delivering push content to the wireless device; a memory coupled to the processor; and a storage device coupled to the processor; the wireless device including one or more modules for rendering content, the content comprising one or more interactive components, the one or more modules being configured to cause the wireless device to: receive a push content package from the communications network, the push content package comprising the content and information about the one or more interactive components, the information about each individual interactive component comprising one or more attributes useful in rendering the individual interactive component; render the content on the at least one display device.

Another aspect of the description provides a method for use in an apparatus comprising a push content server having a processor and a memory, the apparatus for providing content including one or more interactive components to a wireless device, the method comprising: receiving a content file including the content and information about the one or more interactive components, the information about each individual interactive component comprising one or more attributes useful in rendering the individual interactive component; processing the content file and packaging the processed content file as a content package for delivery to the wireless device; and sending the content package to the wireless device as a push delivery.

Figure 1:
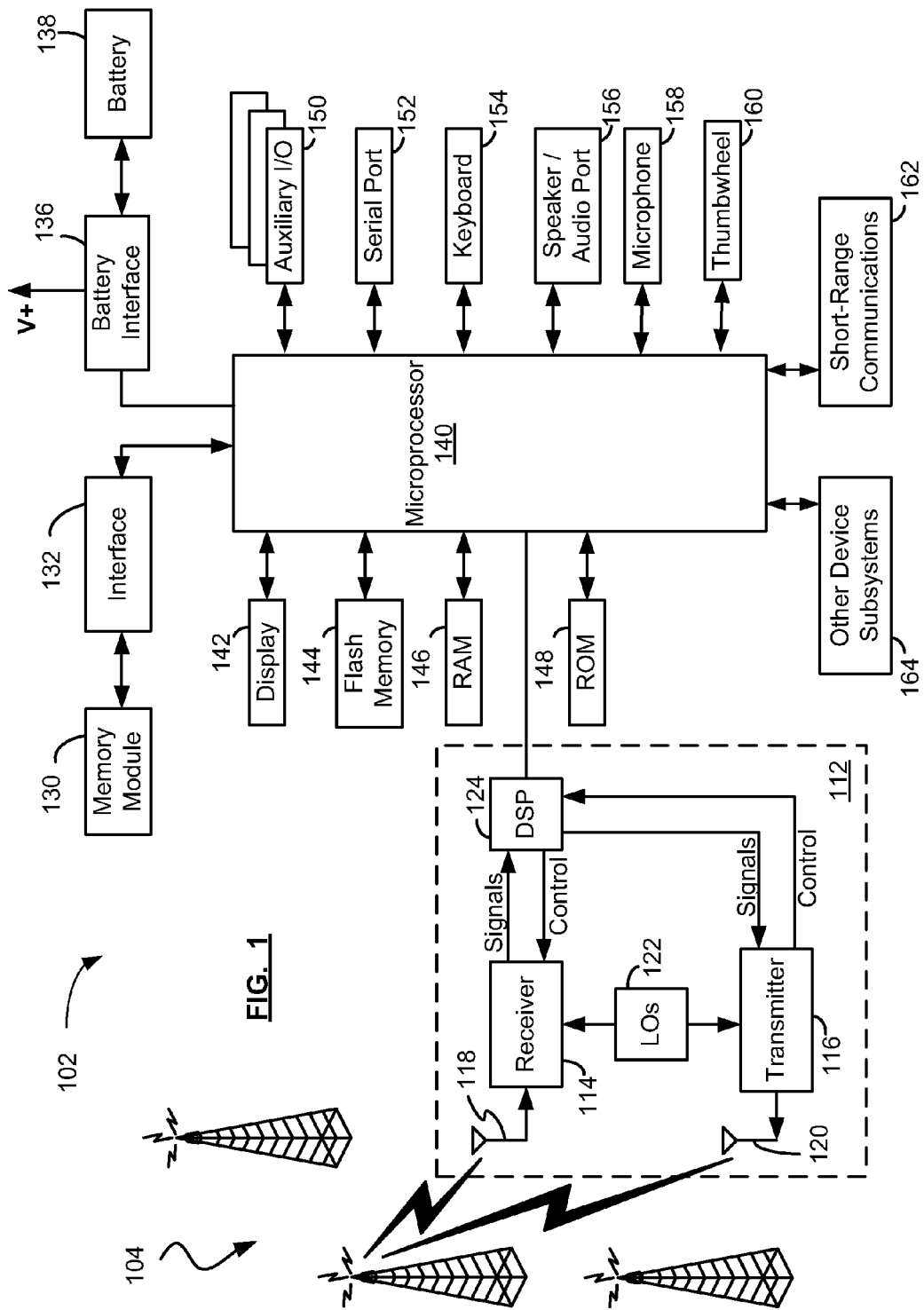
FIG. 1 shows in block diagram form a wireless device suitable for receiving content in accordance with one embodiment.

Reference is first made to FIG. 1, which shows a block diagram illustrating a portable wireless device 102 that is suitable for receiving content in accordance with one aspect of the present disclosure. The wireless device 102 communicates through a wireless communication network 104. The wireless network 104 includes antenna, base stations, and supporting radio equipment as for supporting wireless communications between the wireless device 102 and other devices connected to wireless network 104. The wireless network 104 may be coupled to a wireless network gateway and to a wide area network, shown in FIG. 2.

In one embodiment, the wireless device 102 is a two-way communication device having at least voice and/or data communication capabilities, including the capability to communicate with other computer systems. In one embodiment, the wireless device 102 is a handheld device. Depending on the functionality provided by the wireless device 102, it may be referred to as a data messaging device, a two-way pager, a cellular telephone with data messaging capabilities, a wireless Internet appliance, a data communication device (with or without telephony capabilities), or a portable media or music player. The wireless device 102 may communicate with any one of a plurality of fixed transceiver stations within its geographic coverage area.

The wireless device 102 may incorporate a communication subsystem 112, which includes a receiver 114, a transmitter 116, and associated components, such as one or more antenna elements 118 and 120, local oscillators (LOs) 122, and a processing module such as a digital signal processor (DSP) 124. In one embodiment, the antenna elements 118 and 120 may be embedded or internal to the wireless device 102. As will be apparent to those skilled in the field of communications, the particular design of the communication subsystem 112 depends on the wireless network 104 in which the wireless device 102 is intended to operate.

The wireless device 102 may send and receive communication signals over the wireless network 104 after the required network registration or activation procedures have been completed. Signals received by the antenna 118 through the wireless network 104 are input to the receiver 114, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 124. In a similar manner, signals to be transmitted are processed, including modulation and encoding, for example, by the DSP 124. These DSP-processed signals are input to the transmitter 116 for digital-to-analog (D/A) conversion, frequency up conversion, filtering, amplification, and transmission to the wireless network 104 via the antenna 120. The DSP 124 not only processes communication signals, but also provides for receiver and transmitter control. For example, the gains applied to communication signals in the receiver 114 and the transmitter 116 may be adaptively controlled through automatic gain control algorithms implemented in the DSP 124.

Network access is associated with a subscriber or user of the wireless device 102 via a memory module, such as a memory module 130, which may be a Subscriber Identity Module (SIM) card for use in a GSM network or a USIM card for use in a UMTS. The SIM card is inserted in or connected to an interface 132 of the wireless device 102 in order to operate in conjunction with the wireless network 104. Alternatively, the wireless device 102 may have an integrated identity module for use with systems such as Code Division Multiple Access (CDMA) systems.

The wireless device 102 also includes a battery interface 136 for receiving one or more rechargeable batteries 138. The battery 138 provides electrical power to at least some of the electrical circuitry in the wireless device 102, and the battery interface 136 provides a mechanical and electrical connection for the battery 138. The battery interface 136 is coupled to a regulator (not shown) which provides power V+ to the circuitry of the wireless device 102.

The wireless device 102 includes a microprocessor 140 which controls the overall operation of the wireless device 102. Communication functions, including at least data and voice communications, are performed through the communication subsystem 112. The microprocessor 140 also interacts with additional device subsystems such as a display 142, a flash memory 144, a random access memory (RAM) 146, a read-only memory (ROM) 148, auxiliary input/output (I/O) subsystems 150, a Universal Serial Bus (USB) port 152, a keyboard or keypad 154, a speaker or audio port 156 for connecting to, for example a set of headphones, a microphone 158, a clickable thumbwheel, thumbwheel, or set of scroll buttons 160, a short-range communications subsystem 162, and any other device subsystems generally designated as 164. Some of the subsystems shown in FIG. 1 perform communication-related functions, whereas other subsystems may provide "resident" or on-device functions. Notably, some subsystems, such as the keypad 154, the display 142, and the clickable thumbwheel 160, for example, may be used for both communication-related functions, such as entering a text message for transmission over the wireless network 104, and executing device-resident functions such as a calculator or task list. Operating system software used by the microprocessor 140 is preferably stored in a persistent store such as the flash memory 144, which may alternatively be the ROM 148 or similar storage element. Those skilled in the art will appreciate that the operating system, specific device applications, or parts thereof, may be temporarily loaded into a volatile store such as the RAM 146.

The microprocessor 140, in addition to its operating system functions, enables execution of software applications on the wireless device 102. A predetermined set of applications that control basic device operations, including data and voice communication applications, will normally be installed on the wireless device 102 during or after manufacture. The wireless device 102 may include a personal information manager (PIM) application having the ability to organize and manage data items relating to a user such as, but not limited to, instant messaging, email, calendar events, voice mails, appointments, and task items. One or more memory stores may be available on the wireless device 102 to facilitate storage of information, such as the flash memory 144, the RAM 146, the ROM 148, the memory module 130, or other types of memory storage devices or FLASH memory cards represented by the other device subsystems 164, such as Secure Digital (SD) cards, mini SD cards, micro SD cards, etc.

The PIM and/or media applications have the ability to send and receive data items via either the wireless network 104 or a link to a computer system. The link to the computer system may be via the serial port 152 or the short-range communications subsystem 162. Additional applications may also be loaded onto the wireless device 102 through the wireless network 104, the auxiliary I/O subsystem 150, the serial port 152, the short-range communications subsystem 162, or any other suitable subsystem 164, and installed by a user in the RAM 146 or a non-volatile store such as the ROM 148 for execution by the microprocessor 140. Such flexibility in application installation increases the functionality of the wireless device 102 and may provide enhanced on-device functions, communication-related functions, or both. For example, secure communication applications may enable electronic commerce functions and other such financial transactions to be performed using the wireless device 102.

In a data communication mode, a received data signal representing information such as a text message, an email message, a media file to be transferred, or Web page download will be processed by the communication subsystem 112 and input to the microprocessor 140. The microprocessor 140 will further process the signal for output to the display 142 or alternatively to the auxiliary I/O device 150. A user of the wireless device 102 may also compose data items, such as email messages, for example, using the keypad 154 and/or the clickable thumbwheel 160 in conjunction with the display 142 and possibly the auxiliary I/O device 150. The keypad 154 may be either a complete alphanumeric keypad or telephone-type keypad.

For voice communications, the overall operation of the wireless device 102 is similar, except that the received signals would be output to the speaker or audio port 156 and signals for transmission would be generated by a transducer such as the microphone 158. Alternative voice or audio I/O subsystems, such as a voice message recording subsystem, may also be implemented on the wireless device 102. Although voice or audio signal output is typically accomplished primarily through the speaker or audio port 156, the display 142 may also be used to provide an indication of the identity of a calling party, duration of a voice call, or other voice call related information. Stereo headphones may also be used in place of the speaker 156.

The serial port 152 is normally implemented in a personal digital assistant (PDA) type communication device for which synchronization with a user's computer is a desirable, albeit optional, component. The serial port 152 enables a user to set preferences through an external device or software application and extends the capabilities of the wireless device 102 by providing for information, media file, or software downloads to the wireless device 102 other than through the wireless network 104.

The short-range communications subsystem 162 is an additional optional component which provides for communication between the wireless device 102 and different systems or devices, which need not necessarily be similar devices. For example, the subsystem 162 may include an infrared device and associated circuits and components, or a wireless bus protocol compliant communication mechanism such as a Bluetooth™ communication module to provide for communication with similarly-enabled systems and devices (Bluetooth™ is a registered trademark of Bluetooth SIG, Inc.). In another embodiment, the short-range communications subsystem 162 may be a wireless networking communications subsystem, conforming to IEEE 802.11 standards such as 802.11b, 802.11g, and/or 802.11n.

Figure 2:
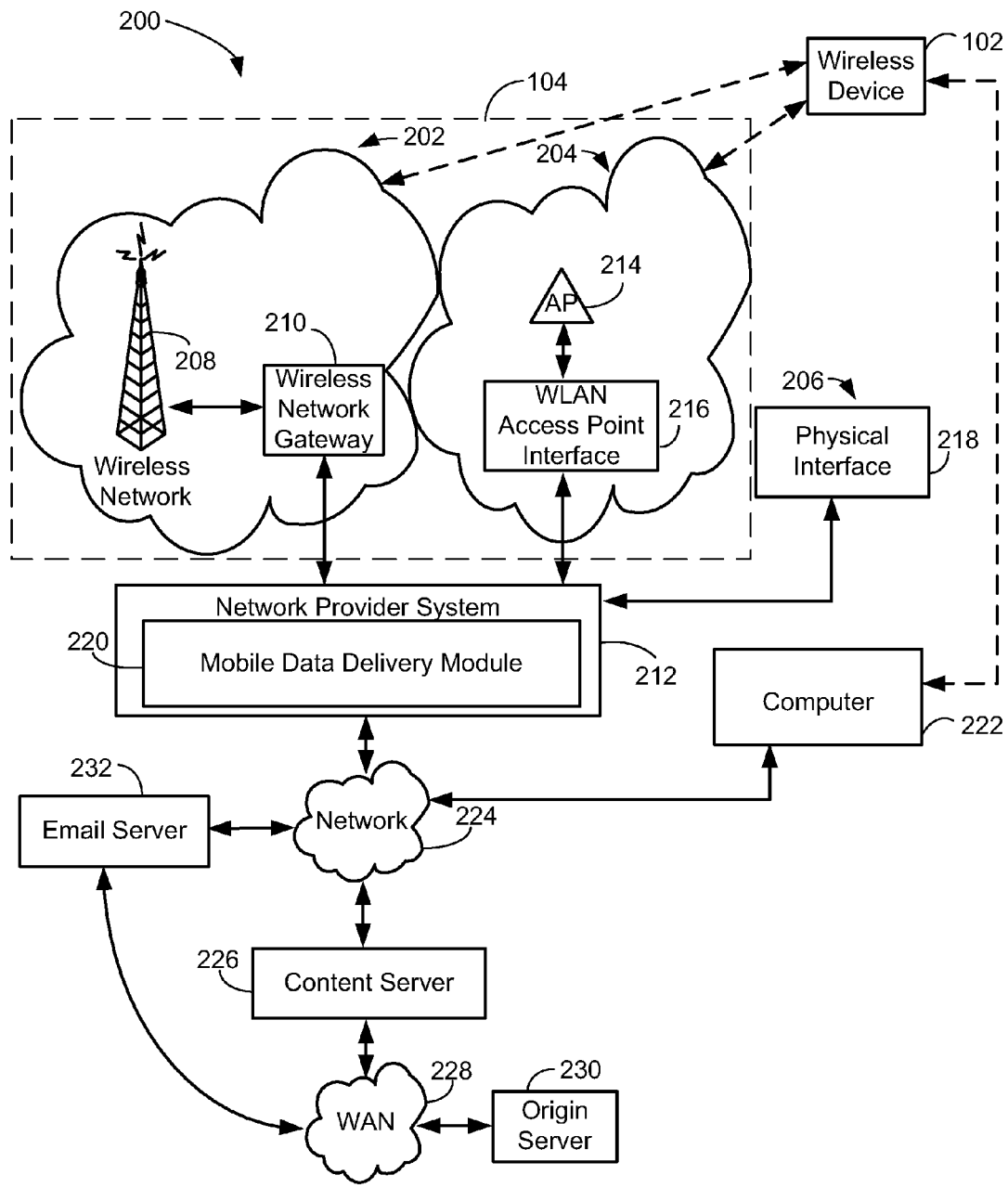
FIG. 2 shows in block diagram form a communication system suitable for providing the operating environment of the wireless device of FIG. 1 in accordance with one embodiment.

Reference is next made to FIG. 2, which shows a communication system 200 suitable for use with the wireless device 102 shown in FIG. 1. The communication system 200 generally includes one or more wireless devices 102 (only one of which is shown in FIG. 2) and the wireless network 104. The wireless network 104 may include a wireless Wide Area Network (WAN) 202, a Wireless Local Area Network (WLAN) 204, and/or other interfaces 206 (which may not necessarily be wireless).

Referring to FIG. 2, the wireless WAN 202 may be implemented as a packet-based cellular or mobile network that includes a number of base stations 208 (one of which is shown in FIG. 2) where each of the base stations 208 provides wireless Radio Frequency (RF) coverage to a corresponding area or cell. The wireless WAN 202 is typically operated by a cellular network service provider that sells subscription packages to users of the wireless devices 102. The wireless WAN 202 comprises a number of different types of networks, for example, Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network) or various other third generation networks such as EDGE (Enhanced Data rates for GSM Evolution), UMTS (Universal Mobile Telecommunications Systems), Third Generation Partnership Project (3GPP or 3G), or Evolution-Data Optimized (EV-DO).

As shown in FIG. 2, the communications system 200 also includes a wireless network gateway 210 and one or more network provider systems 212. The wireless network gateway 210 provides translation and routing services between the network provider system(s) 212 and the WAN 202, which facilitates communication between the wireless devices 102 and other devices (not shown) connected, directly or indirectly, to the network provider system 212.

The WLAN 204 comprises a network which in some examples conforms to IEEE 802.11 standards such as 802.11b, 802.11g, and/or 802.11n; however, other communications protocols may also be used for the WLAN 204. The WLAN 204 includes one or more wireless RF Access Points (AP) 214 (one of which is shown in FIG. 2) that collectively provide a WLAN coverage area. For the embodiment depicted in FIG. 2, the WLAN 204 is operated by an enterprise (for example, a business or university in a building or campus type environment) and the access points 214 are connected to an access point (AP) interface 216. The AP interface 216 provides translation and routing services between the access points 214 and the network provider system 212 to facilitate communication between two or more of the wireless devices 102 and other devices (e.g., such as desktop computers) connected, directly or indirectly, to the network provider system 212. The AP interface 216 is implemented using a computer, for example, a server running a suitable computer program or software.

According to one embodiment, the other interfaces 206 may be implemented using a physical interface indicated by reference 218. The physical interface 218 includes an Ethernet, Universal Serial Bus (USB), Firewire, or infrared (IR) connection implemented to exchange information between the network provider system 212 and the wireless device 102.

The network provider system 212 comprises a server or server modules or a number of servers or server modules which are typically located behind a firewall (not shown). The network provider system 212 may include a number of modules including a mobile data delivery module 220. Various modules running on the network provider system 212 may be implemented as a number of services running on a single server or as a number of interconnected servers each running a software program to implement the functionality of the respective module. The network provider system 212 provides access for the wireless devices 102, through either the wireless WAN 202, the WLAN 204, or the other connection 206 to the devices connected, for example, through an enterprise network 224 (e.g., an intranet), to the network provider system 212. In one embodiment, the data delivery module 220 is implemented on a computer, such as the network provider system 212.

The enterprise network 224 comprises a local area network, an intranet, the Internet, a direct connection, or combinations thereof. The enterprise network 224 may comprise an intranet for a corporation or other type of organization. In at least some embodiments, the network provider system 212 is part of the enterprise network 224, and is located behind a corporate firewall and connected to the wireless network gateway 210 through the Internet. A computer 222 (e.g., a desktop or laptop computer) belonging to the user of the wireless device 102 is typically connected to the enterprise network 224. As described earlier, the wireless device 102 may be temporarily and directly connected to the computer 222 using, for example, the serial port 152. This direct connection may make use of a cradle or docking station connected to a serial port of the computer 222, where the mobile device 102 is placed in the cradle, therefore completing the serial connection between the mobile device 102 and the computer 222. Alternatively, the wireless device 102 may communicate with the computer 222 using the communication subsystem 112 and the WAN 202 and/or the short-range communications subsystem 162 and the WLAN 204.

As shown in FIG. 2, an application/content server 226 may be connected to the enterprise network 224 and also to another network, for example a Wide Area Network (WAN) 228. In some embodiments, an email server 232 and/or the content server 226 form part of the enterprise network 224. The WAN 228 may further connect to other networks. The WAN 228 may comprise or be configured with the Internet, a direct connection, a LAN, a wireless communication link, or any combination thereof. Content providers, such as Web servers, may be connected to the WAN 228, an example of which is shown in FIG. 2 as an origin server 230.

According to one embodiment, the mobile data delivery module 220 provides connectivity between the wireless WAN 202 and the WLAN 204 and the other connection 206 and devices and/or networks connected directly or indirectly to the network provider system 212. In one embodiment, the connectivity provided may be Hypertext Transfer Protocol (HTTP) based connectivity providing an Internet based service connection to devices connected to the wireless WAN 202, the WLAN 204, or the other connection 206 and devices and/or networks connected directly or indirectly to the network provider system 212. The network 224, the application/content server 226, the WAN 228, and the origin server 230, are individually and/or collectively in various combinations a content source for the network provider system 212. It will be appreciated that the system shown in FIG. 2 comprises but one possible communication network or configuration of a multitude of possible configurations for use with the wireless devices 102.

Figure 3:
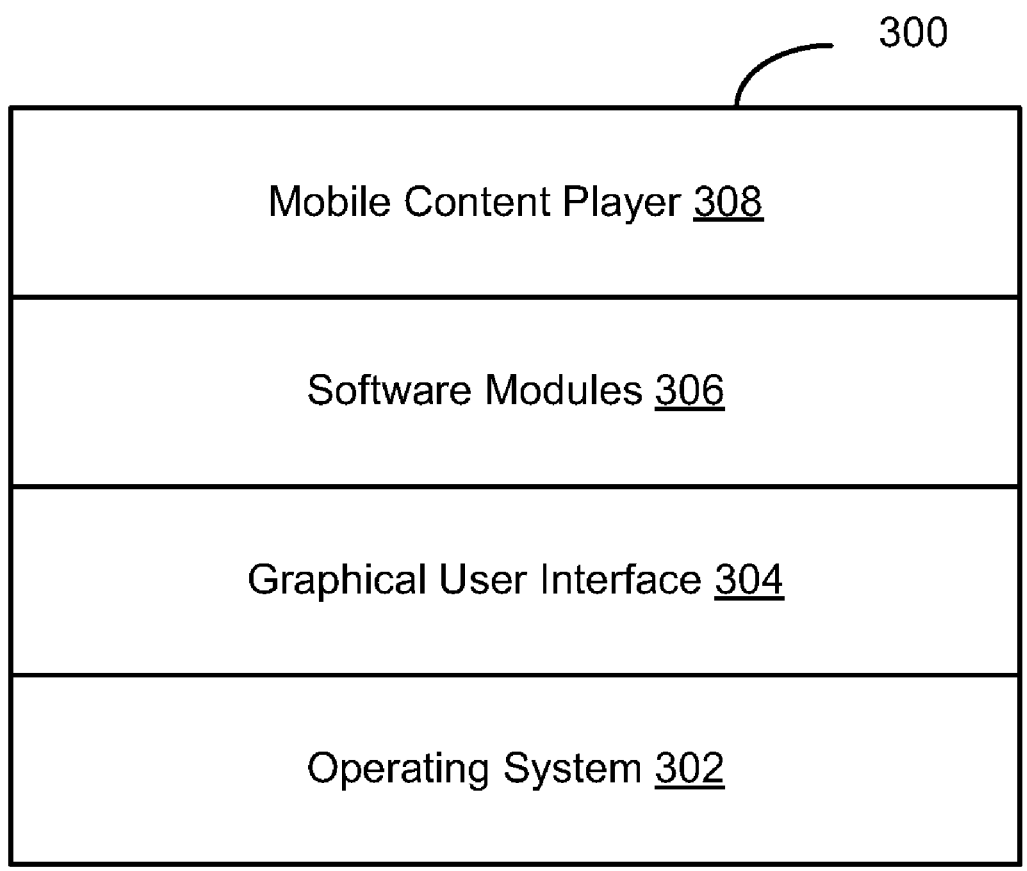
FIG. 3 shows in block diagram form the contents of a memory of the wireless device of FIG. 1.

Reference is next made to FIG. 3, which shows a block diagram illustrating a memory 300 of the wireless device 102. The memory 300 has various software components for controlling the wireless device 102 and may include, for example, the flash memory 144, the RAM 146, the ROM 148, the memory module 130 and/or the other device subsystems 164. In accordance with one embodiment, the wireless device 102 is intended to be a multi-tasking wireless communications device configured for sending and receiving data items and for making and receiving voice calls that also includes various applications enabling users to listen to music, watch video files, play games, view picture files, surf the internet wirelessly, etc. To provide a user-friendly environment to control the operation of the wireless device 102, an operating system (OS) 302 resident on the wireless device 102 provides a basic set of operations for supporting various applications typically operable through a graphical user interface (GUI) 304. For example, the operating system 302 provides basic input/output system features to obtain input from the auxiliary I/O 150, the keypad 154, the clickable thumbwheel 160, and other input devices, and to facilitate output to the user via the display 142. The GUI 304 is typically a component of the operating system 302. One or more software modules 306 for managing communications or providing a personal digital assistant (PDA) or other functions may also be included. The memory 300 also includes an email and calendar client, which may be combined in, for example, a PIM application having email-based calendaring and scheduling functions. Typically, the PIM is installed as one of the software modules 306.

The memory 300 also includes a mobile content player 308, which may also be referred to as a content delivery module. In one example, the mobile content player 308 may be integrated into the operating system 302. Alternatively, the module 308 may be a separate software component, as illustrated in FIG. 3. The mobile content player 308 may be responsible for managing content delivery from the perspective of the wireless device 102 and/or playing the content, which may include interactive components, on the wireless device 102. Operation of the mobile content player 308 will be described in more detail below, in connection with FIG. 5.

Thus, the wireless device 102 includes computer executable programmed instructions for directing the wireless device 102 to implement various applications. The programmed instructions may be embodied in the one or more software modules 306 resident in the memory 300 of the wireless device 102. Alternatively, the programmed instructions may be tangibly embodied or stored on a computer readable medium (such as a DVD, CD, floppy disk or other storage media) which may be used for transporting the programmed instructions to the memory 300 of the wireless device 102. Alternatively, the programmed instructions may be embedded or carried in a computer-readable, signal-bearing medium that is uploaded to the wireless network 104 by a vendor or supplier of the programmed instructions, and this signal-bearing medium may be downloaded through one or more of the interfaces 112, 150, 152, 162 to the wireless device 102 from, for example, the wireless network 104 by end users.

Figure 4:
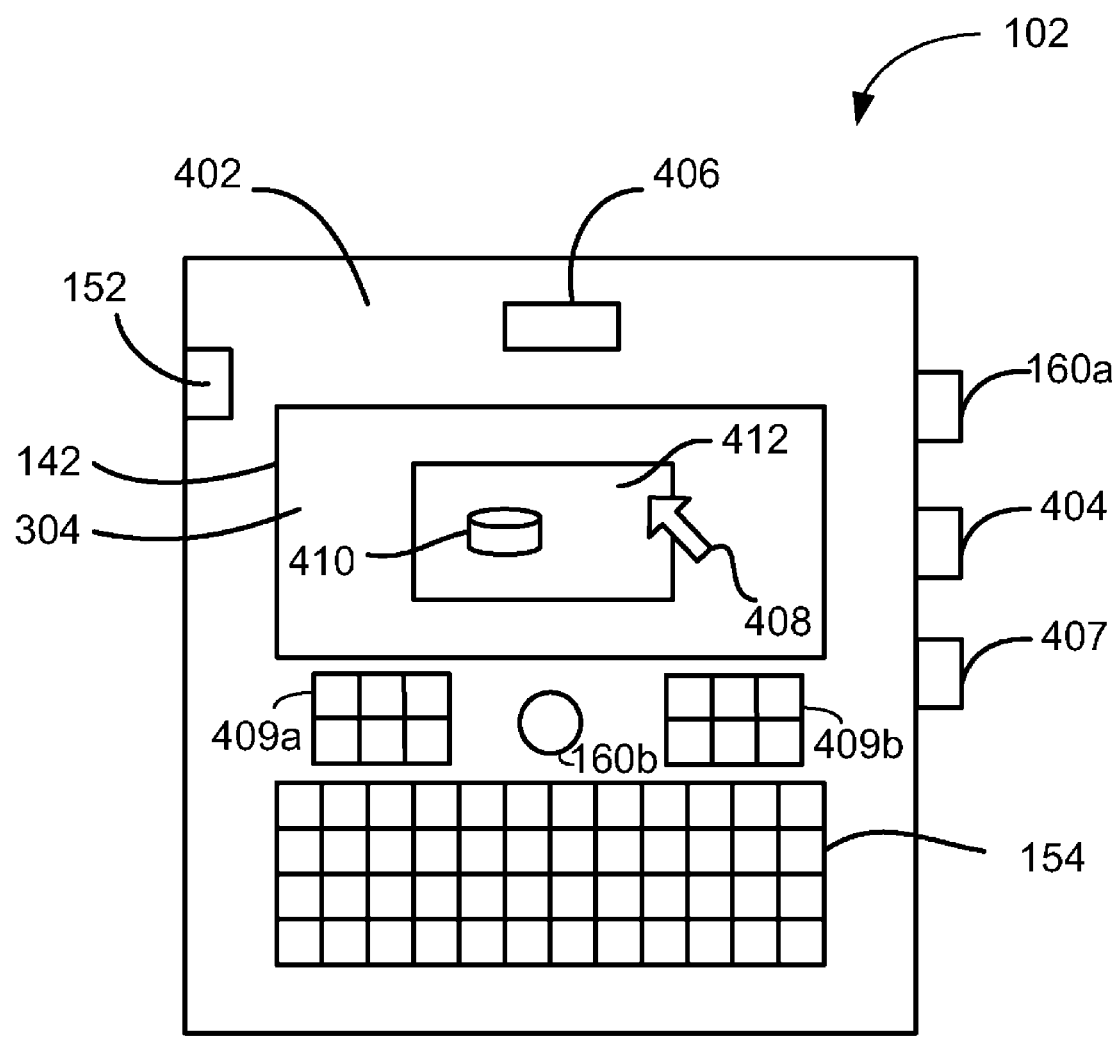
FIG. 4 is a front view illustrating the wireless device of FIG. 1.

Reference is next made to FIG. 4, which shows a front view of the wireless device 102. As mentioned above, the wireless device 102 may be a data and voice-enabled handheld device. The wireless device 102 includes a casing 402, the data or serial port 152, the display screen 142, the graphical user interface (GUI) 304, the keypad 154, the clickable thumbwheel or scroll buttons 160a or other device for navigation such as a trackball 160b, one or more input buttons 404 (e.g., select, cancel, talk, play, stop, fast forward, rewind, next, previous buttons), signal inputs/outputs 406 (e.g., direct wire connection or inductive coupling power connector input, microphone, speaker, data interface input, etc.), and an audio port 407. Additionally, the wireless device 102 may have a number of navigation control buttons represented by numerals 409a and 409b. The navigation control buttons 409 may provide a number of functions such as a send and/or end key for a mobile telephone application of the wireless device 102, a menu key, an escape key, etc. The functions of the navigation control buttons 409 may be user configurable. Internally, the wireless device 102 includes one or more circuit boards (not shown), the microprocessor 140 (FIG. 1), the memory 300 (FIG. 3), the battery 138 (FIG. 1), the antennae 118, 120 (FIG. 1), etc., which may all be coupled to the signal inputs/outputs 406, the keypad 154, the display screen 142, the clickable thumbwheel 160, etc.

The microprocessor 140 is typically coupled to one or more input devices (e.g., the buttons 404, the keypad 154, the clickable thumbwheel 160a, the trackball 160b) for receiving user commands or queries and the display 142 for displaying the results of these commands or queries. For example, user queries may be transformed into a combination of commands for producing one or more tables of output data which may be incorporated in one or more display pages for presentation to the user. The microprocessor 140 is also coupled to the memory 300.

A user may interact with the wireless device 102 and its software modules 306 using the GUI 304. The GUI 304 is controlled by the operating system 302 (FIG. 3) and provides a display format enabling the user to choose commands, execute application programs, manage computer files, and perform other functions by selecting pictorial representations (i.e., icons), or selecting items from a menu through the use of an input or pointing device such as the clickable thumbwheel 160 and/or the keypad 154. Generally, the GUI 304 is used to convey information and receive commands from users and generally includes a variety of GUI objects or controls including icons, toolbars, drop-down menus, pop-up menus, text, dialog boxes, buttons, etc. A user typically interacts with the GUI 304 presented on the display 142 by using an input or pointing device to position a pointer or cursor 408 over an object 410 (i.e., "pointing" at the object) and by "clicking" on the object 410 (e.g., by depressing the thumbwheel 160 or a button on the keyboard 154, etc.). This is often referred to as a point-and-click or selection operation. Typically, the object 410 may be highlighted (e.g., shaded) when it is selected or pointed at by the pointer or cursor 408 to indicate that the object 410 is selectable.

Typically, a GUI-based system presents application, status, and other information to the user in windows appearing on the display 142. A window 412 is a display area shown within the display 142, typically rectangular, in which a user may view an application or document. The window 412 may be open, closed, displayed full screen, reduced to an icon, increased or reduced in size, or moved to different areas of the display 142. Multiple windows 412 may be displayed simultaneously. For example, the windows 412 may be displayed within other windows, overlapped with other windows, or tiled within the display area.

The term "push" is used herein to refer to a method of content delivery to a mobile device that is automatically delivered by a content server without any action being required on the part of a user of a wireless device 102.

Figure 5:
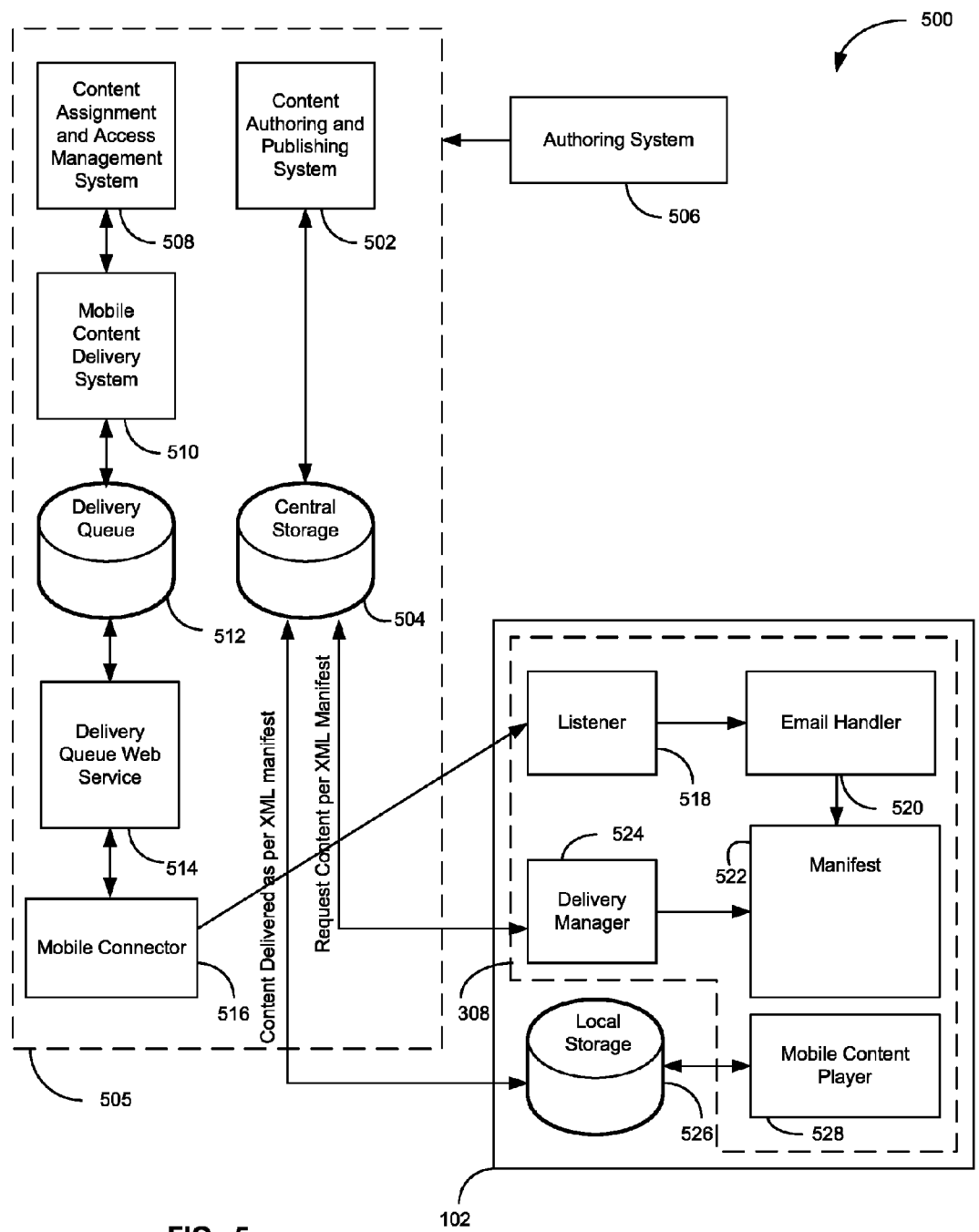
FIG. 5 shows in simplified block diagram form the communications system of FIG. 2 and the wireless device of FIG. 1 configured to provide content to the wireless device in accordance with one embodiment.

Reference is next made to FIG. 5, which shows in simplified block diagram form an authoring system 506, the communications system of FIG. 2 and the wireless device of FIG. 1, represented as a system 500, configured to deliver specialized content to the wireless device 102 in accordance with one embodiment. The system 500 generally includes an authoring system 506, a content server 505 and the wireless device 102.

The authoring system 506, allows a user to open an existing content file or create a new content file. In some embodiments, the authoring system may be integrated into an application for document creation such as a presentation authoring application, such as, for example, Microsoft™ Power-Point™, using an add-in application. In such embodiments, when the add-in is installed, a separate menu item can appear in the application's menus that provides the user with options for authoring, publishing and delivering the content. In some embodiments, content may be created in an application such as a slideshow or presentation application add-in and sent to the content authoring and publishing system 502 as described in a co-pending PCT patent application no. PCT/CA2008/002275 entitled "A Method and System for Authoring Mobile Content in a Slideshow or Presentation Application for Direct Delivery to a Mobile Device", which is hereby incorporated by reference in its entirety.

The authoring system 506 may allow interactive components to be included in the content, such as clickable activities, radio boxes, text boxes or the like. An interactive component will generally have one or more associated attributes.

In some embodiments, the attributes can include the location of an activation area and possibly one or more commands to be executed when the activation area is selected by a user. For example, the interactive component may be a clickable activity where the activation area is activated when the user 'clicks' on the activation area. For example, the activation area may include a telephone number and clicking on the activation area may execute commands to initiate a telephone call or an SMS message to be sent to the number indicated. If the activation area includes an email address, clicking on the activation area could allow the user to compose an email to be sent to that address. As another example, the activation area could include a Universal Resource Locator (URL) which invokes a web browser when the area is activated by the user. Further examples could include launching a video or audio player or mapping coordinates or addresses. Where interactive components have been included in the content, the authoring system may determine the location of an activation area of an interactive component and provide this information along with any other attributes, such as associated commands, to the content server 505.

In some embodiments, the authoring system may use regular expressions to identify interactive components within the content. Information about an interactive component could, for example, be stored as a virtual business card.

The content server 505 generally comprises a content authoring and publishing system 502, a central storage 504, a content assignment and access management system 508, a mobile content delivery system 510, a delivery queue 512, a delivery queue web service 514 and a mobile connector 516.

The content authoring and publishing system 502 may be used to format, publish and/or centrally store in the central storage 504 new content received from the authoring system 506. The content authoring and publishing system 502 may be implemented, for example, using a number of systems in the market today, which provide for creation and central storage of content formatted for wireless devices. Alternatively, the content authoring and publishing system 502 may be implemented using solutions yet to be developed.

The content authoring and publishing system 502 may receive content files from the authoring system 506. The content authoring and publishing system 502 may also include a reformatting component for formatting content for use by the wireless device 102. Content may, in one example, be described as one or more media types that when combined create a content package. This package may include, for example, text, images, video, and/or audio. The content package may also include information about embedded interactive components including the associated attributes. The content package may be stored in the central content storage 504 for later access.

Authoring of some of the content may be accomplished by a different application and then saved to the central storage 504. For example, an audio clip may be authored in an audio editing tool, saved, and then published to a central content server, such as central storage 504. In some embodiments, another system (not shown) may manage access to this content.

The content package may be assigned to users for consumption. This may be initiated, for example, by the author of the content through the authoring system 506. This assignment may function as a trigger for the delivery to occur. In one example, the content assignment and access management system 508 may make a request to the mobile content delivery system 512 to send all the content directly to a user's wireless device 102 after the user has accepted the invitation to add the content server 505. This request may contain information identifying what type the content is (e.g., a mobile learning course) and target user information so the delivery can be directed to specific wireless devices 102 belonging to specific individual users. The request may also contain information that the content server 505 uses to find all elements of the content to be delivered. The content assignment may not need any knowledge of the mobile transport platform being used, which may be configured in the mobile connector 516 and may be tied to a user's wireless device 102 type.

If the content publisher wishes to send an invitation to a specific user to opt in to the content server 505 then the invitation to that user may be created by the content assignment and access management system 508. This invitation may be created and sent to the mobile content delivery system 512 for delivery to the wireless device 102 of the selected user.

The mobile content delivery system 512 may receive requests for delivering content. When these requests are received, the mobile content delivery system 512 may look up the target and determine if the user has a wireless device 102 and if that device has a transport defined. The request may be verified to be in the proper format and then processed. If the user does not have a wireless device 102 or a transport has not been defined, then the appropriate response is returned to the requesting system. Every user may register with the mobile content delivery system 512 to ensure the deliveries can take place. Once this information is gathered, the mobile content delivery system 512 may place the request onto the delivery queue 512 with a status indicated as "new". In one example, the request may be an XML request.

Each XML request may be populated with a company identifier that determines which company is authorized to view the XML request on the delivery queue 512. Modifications to the content may occur after the content has been delivered. It may be left to the calling application to send a new delivery request for the content if it has changed.

The delivery queue web service 514 may listen for requests made by the mobile connector 516. These requests may determine if there are items on the queue 512 that the mobile connector 516 is able to extract and deliver.

The mobile connector 516 may poll the delivery queue web service 514 in predefined intervals to see if there is any content available that needs to be delivered. The mobile connector 516 may issue a web services call to the delivery queue web service 514. This call may contain user credentials that the web service 514 authenticates to determine what queue items the mobile connector 516 is authorized to see. If there are no items authorized, the mobile connector 516 may wait for a predefined time interval to elapse and try again. If the mobile connector 516 does find an item on the queue, the mobile connector 516 may retrieve the queued item as, for example an XML document that describes the content. The mobile connector 516 may only process one queued item at a time, but may alternatively be configured to process multiple items at a time.

When the mobile connector 516 receives an XML transaction from the web service 514, the mobile connector 516 looks up the intended transport for the wireless device 102 type and delivers to the wireless device 102. The mobile connector 516 may further return result codes back to the delivery queue web service 514 based on the ability of the mobile connector 516 to successfully send the delivery request to the wireless device 102 infrastructure.

The mobile connector 516 may work simultaneously with several mobile platforms or transport types. This may include any transport that allows a real-time delivery of content to the wireless device 102, or any mechanism that publishes the content directly to the wireless devices 102 wirelessly.

The wireless device 102 generally includes a listener 518, an email handler 520, a manifest 522, a delivery manager 524, local storage 526 and a mobile content player 528.

The listener 518 may listen for the request sent from the mobile connector 516. The request can comprise a manifest file 522 (e.g. an XML manifest) including a content URL for each component of the content package. The listener 518 may receive the manifest 522 and extract each content URL. The listener 518 may then send each content URL to the delivery manager 524 for retrieval form the central storage 504 using the content URLs.

If a request is received via e-mail, the wireless device 102 processes the e-mail through the email handler 520. The email handler 520 decrypts the contents of the email, if encrypted, that contain the instructions for retrieving the manifest 522, reads the e-mail information into memory, and then deletes the e-mail from the user's wireless device 102 email inbox. The email handler 520 uses the information stored in memory to make an HTTP request to the content server 505 requesting the manifest 522. When the content server 502 determines that a user's e-mail and PIN are valid, it sends the manifest to the mobile device 102 through its HTTP response.

The delivery manager 524 may process a manifest file 522 by retrieving each item specified by URL in the manifest file 522 from the central content storage 504. These items may be placed in the wireless device local device storage 526. Once content is delivered to the wireless device 102, the content remains in the local storage 526 for the mobile content player 528 to render it. The delivered content may be removed from either the player 528 or from the mobile content delivery system 512. If the player 528 attempts to render content that has been removed from the local storage 526, then the player 528 may automatically attempt to retrieve the content from the content server 505.

The mobile content player 528 may be programmed to render various content types on the mobile device. The mobile content player 528 may also be programmed to render the interactive components, for example, by rendering an activation area on the visual representation of the content based on a location attribute determined previously and received as part of the content package. The mobile content player 528 may be programmed to detect when an activation area has been selected (e.g. clicked on) by a user of the wireless device and to execute any associated commands.

One aspect of the present application may make use of caching servers for content delivery to the wireless devices 102. When a delivery occurs, the content may be retrieved from a local caching server instead of the centralized content server 505.

While the content server 505 and authoring system 506 are represented as distinct components and have a number of sub-components, any of these components or subcomponents may be implemented as modules running on a number of interconnected servers or on a single server, depending on the design criteria of a particular application. For example, any of the components 502, 504, 506, 508, 510, 512, 514, and 516 may be implemented on any of the network provider system 212, the network 224, the content server 226, the email server 232, or the origin server 230. Alternatively, in one example, the components 502, 504, 506, 508, 510, 512, 514, and 516 may be implemented on a single one of the network provider system 212, the network 224, the content server 226, the email server 232, or the origin server 230.

Figure 6:
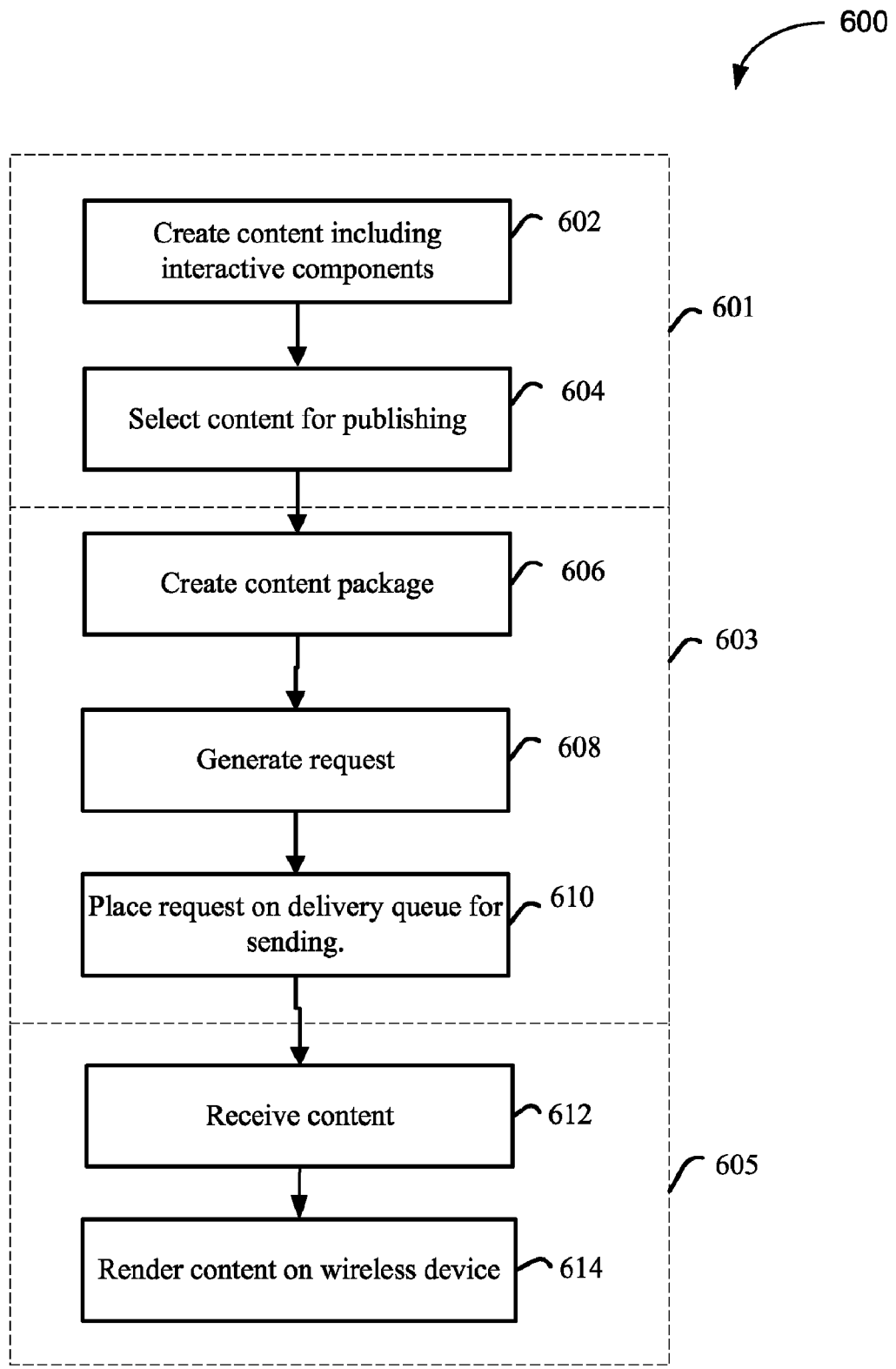
FIG. 6 shows in flowchart form a method for providing content including interactive components to the wireless device in accordance with one embodiment.

Reference is next made to FIG. 6, which shows in flowchart form a method 600 for providing content including interactive components to the wireless device in accordance with one aspect of the present disclosure. This method is suitable for use, for example, with the system 500 of FIG. 5. A first part of the method 600, indicated by reference 601, is generally implemented by component 506 shown in FIG. 5, a second part of the method 600, indicated by reference 603, is generally implemented by component 505 shown in FIG. 5 and a third part of the method 600, indicated by reference 605, is generally implemented by the wireless device 102.

At block 602, content can be created, using authoring system 506. For example, the content may be a slide presentation. For each interactive component within the content, the authoring system 506 may determine the location of an activation area for the interactive component, for example, on a visual representation of the content. For example, if the content were a slide presentation, the authoring system could determine the location of the activation area on one of the slides. The location of the activation area may, for example, be determined as a set of coordinates on the visual representation of the content. These coordinates may be expressed as a set of absolute coordinates or as a set percentages. For example, if the upper right corner of an activation area appeared in the exact center of an 8×10 slide, the coordinates of the upper right hand corner of the activation area could be expressed as (4,5) or as (50%,50%). In other embodiments, the location of an interactive component may be expressed relative to another rendered component. Those of skill in the art will recognize that there are many possible methods for determining or expressing the location an interactive component.

At 604, the user may select to publish the content, for example, from a publish feature within a menu of the application. The user can then select the publish and delivery options for the content file. When options are set, the user can publish and deliver the content directly to one or more wireless devices 102 through the content server 505, for example, by pushing a button within a publish feature interface. The content is then sent to content server 505.

At 606, the content can be received by the content server 505. The content can be parsed into its various components and formatted according to the specifications of the wireless device 102 to create a content package. This content package may include one or more images, representing the visual content, and/or text as well as embedded components such as video, audio and information regarding interactive components, including attributes such as, for example, the location of the activation area for an interactive component and any associated commands. The images may be stored, for example, in one or more image files such as, for example, PNG, GIF, JPEG or the like. The images may be resampled to a resolution compatible with the wireless device 102. Any audio that was inserted into the content such as, for example, MP3 files or WAV files, can be transcoded into, for example, an AMR Audio format supported by, for example, Black-Berry™ devices. A location attribute for an interactive component received from the authoring system may be recalculated, if necessary, to reflect the resolution and other characteristics of the wireless device 102 on which the content is to be presented. More than one recalculated location may be necessary where the content may be rendered on more than one type of wireless device 102. The content package is then saved in a content database, such as the central storage device 504. This may be done using, for example, the content authoring and publishing system 502.

Next, at a block 606, a request file can be generated containing information pertaining to the content to be delivered to the wireless device 102, such as an identification of target wireless devices 102 to which the content files are desired to be pushed, the addresses of the content files (e.g., such that the content files may be retrieved with an HTTP request from the central storage 504). This may be done using, for example, the content assignment and access management system 508.

Next, at a block 608, a request can be placed on the delivery queue specifying the content to deliver to specific user. For example, the request may be placed on the delivery queue 512 by the mobile content delivery system 510 using the request file, as described above in reference to FIG. 5.

At 612, the wireless device 102 can receive the content to be rendered. For example, as explained above, the wireless device can receive a manifest 522 sent from the mobile connector 516, extract the URL locators for the content on central storage 504 and store the content in the local storage 526.

At 614, the content, including the interactive components, can be rendered on the wireless device 102. The wireless device 102 can contain client side components, as shown in FIG. 5 and explained above, which allow the content package to be processed and displayed. The mobile content player 528 can understand how to render various content types. Based on the content package received and the manifest, the mobile content player 528 can understand what is an interactive component and where to render it. For example, as mentioned above, the visual content may be stored as one or more image files. If an interactive component were a clickable action to appear within an image file, the mobile content player may use location information for the activation area to render the clickable action within the displayed image. When the user clicks, or otherwise selects, the activation area, appropriate commands can be executed.

One possible application of the above described embodiments is a user assessment which could be included within the content used, for example, to receive feedback from a user regarding the a mobile learning course. The assessment could include interactive components such as text boxes, radio boxes and the like. The assessment could also include clickable activities such as a button to be clicked by the user when the assessment is complete. In some embodiments, the assessment could be associated with an image with one or more activation areas for the interactive components rendered thereon. In other embodiments, the assessment could be created as an XML file included in the content package with the interactive components included in the XML language.

Within user assessments, the interactive components may be grouped, for example, into one or more questions. Attributes may be associated with a group of components representing a question. For example, a number of radio buttons forming a single question may be grouped and attributes may be associated with the group of radio buttons. This attributes may indicate, for example, that only one of the radio buttons may be selected. The group attributes may also include executable commands which, for example, may be executed when a question has been answered by a user.

Similarly, the user assessment as a whole may also include associated attributes. For example, the attributes of an assessment may indicate that an assessment may be run only once, may be run many times, may be run offline or may not be run offline.

The embodiments of the present disclosure described above are intended to be examples only. Those of skill in the art may effect alterations, modifications and variations to the particular embodiments without departing from the intended scope of the present disclosure. In particular, selected features from one or more of the above-described embodiments may be combined to create alternative embodiments not explicitly described, features suitable for such combinations being readily apparent to persons skilled in the art. The subject matter described herein in the recited claims intends to cover and embrace all suitable changes in technology.

The invention claimed is:

1. A system for providing content to a wireless device, the content including one or more interactive components, at least one of the one or more interactive components being for initiating an application in response to a received input wireless device, the system comprising:
    a content server configurable to deliver push content to the wireless device;
    a processor for controlling operation of the server;
    a communications subsystem coupled to the processor for communicating with a communications network; and
    a memory coupled to the processor;
the content server including one or more modules for providing the content to the wireless device, the one or more modules being configured to cause the content server to:
    receive a content file including the content and information about the one or more interactive components, the information about each individual interactive component comprising one or more attributes useful in rendering the individual interactive component, wherein at least one of the one or more interactive components includes a selectable activation area for initiating the application in response to the received input, and wherein the one or more attributes includes a definition of a visual location of the activation area;
    process the content file and package the processed content file as a content package for delivery to the wireless device; and
    send the content package to the wireless device as a push delivery.

2. The system of claim 1, wherein the one or more attributes for at least one of the one or more interactive components comprises one or more coordinates of an activation area.

3. The system of claim 2, wherein the content file comprises visual content and the system further comprises a reformatting component for reformatting the visual content into one or more visual content files capable of being rendered on the wireless device and, for each of the one or more interactive components, recalculating the one or more coordinates based on the reformatted visual content.

4. The system of claim 3, wherein the visual content comprises a slide presentation.

5. The system of claim 3, wherein the visual content files are image files.

6. The system of claim 3, wherein reformatting the visual content comprises creating an image file with a resolution compatible with a resolution of the wireless device.

7. The system of claim 1, wherein the one or more attributes for at least one of the one or more interactive components comprises one or more executable commands.

8. The system of claim 1, wherein the one or more interactive components comprise one or more clickable activities.

9. The system of claim 1, wherein the content file comprises a user assessment.

10. The system of claim 9, wherein two or more of the one or more interactive components are grouped into one or more questions.

11. The system of claim 10, wherein at least one of the one or more questions includes one or more question attributes, the one or more question attributes comprising one or more executable commands.

12. The system of claim 9, wherein one or more of the one or more interactive components comprises a clickable activity to be activated by a user of the wireless device when the user assessment has been completed.

13. The system of claim 9, wherein the user assessment includes one or more assessment attributes.

14. The system of claim 9, wherein the user assessment is stored as an XML file.

15. A wireless device comprising:
    a processor for controlling operation of the wireless device;
    at least one input device coupled to the processor for accepting input from a user;
    at least one display device coupled to the processor for communicating an output to the user;
    a communications subsystem coupled to the processor for communicating with a communications network, the communications network including at least one content server configurable for delivering push content to the wireless device;
    a memory coupled to the processor; and
    a storage device coupled to the processor;
the wireless device including one or more modules for rendering content, the content comprising one or more interactive components, at least one of the one or more interactive components being for initiating an application in response to a received input, the one or more modules being configured to cause the wireless device to:
    receive a push content package from the communications network, the push content package comprising the content and information about the one or more interactive components, the information about each individual interactive component comprising one or more attributes useful in rendering the individual interactive component, wherein at least one of the one or more interactive components includes a selectable activation area for initiating the application in response to the received input and wherein the one or more attributes include a definition of a visual location of the activation area; and
    render the content on the at least one display device.

16. The wireless device of claim 15, wherein rendering the content comprises rendering the one or more interactive components on the display device according to the one or more attributes.

17. The wireless device of claim 15, wherein the one or more attributes for at least one of the one or more interactive components comprises one or more coordinates of an activation area.

18. The wireless device of claim 15, wherein the one or more attributes for at least one of the one or more interactive components comprises one or more executable commands.

19. The wireless device of claim 17, wherein the one or modules are further configured to execute one or more commands associated with a particular interactive component when an input is received indicating that the user has selected an area within the one or more coordinates associated with the particular interactive component using the at least one input device.

20. The wireless device of claim 19, wherein the one or more interactive components comprise one or more clickable activities and the input received is an indication that the user has clicked an area within the one or more coordinates associated with the particular interactive component.

21. The wireless device of claim 15, wherein the content comprises a slide presentation.

22. The wireless device of claim 15, wherein the content file comprises a user assessment.

23. The wireless device of claim 22, wherein two or more of the one or more interactive components are grouped into one or more questions.

24. The wireless device of claim 22, wherein at least one of the one or more questions includes one or more question attributes, the one or more question attributes comprising one or more executable commands.

25. The wireless device of claim 22, wherein one or more of the one or more interactive components comprises a clickable activity to be activated by a user of the wireless device when the user assessment has been completed.

26. The wireless device of claim 22, wherein the user assessment includes one or more assessment attributes.

27. The wireless device of claim 22, wherein the user assessment is stored as an XML file.

28. A method for use in an apparatus comprising a push content server having a processor and a memory, the apparatus for providing content to a wireless device, the content including one or more interactive components, at least one of the one or more interactive components being for initiating an application in response to a received input, the method comprising:

receiving a content file including the content and information about the one or more interactive components, the information about each individual interactive component comprising one or more attributes useful in rendering the individual interactive component, wherein at least one of the one or more interactive components includes a selectable activation area for initiating the application in response to the received input and wherein the one or more attributes include a definition of a visual location of the activation area;

processing the content file and packaging the processed content file as a content package for delivery to the wireless device; and sending the content package to the wireless device as a push delivery.

29. The method of claim 28, wherein the one or more attributes for at least one of the one or more interactive components comprises one or more coordinates of an activation area.

30. The method of claim 29, wherein the content file comprises visual content and the method further comprises reformatting the visual content into one or more visual content files capable of being rendered on the wireless device and, for each of the one or more interactive components, recalculating the one or more coordinates based on the reformatted visual content.

31. The method of claim 30, wherein reformatting the visual content comprises creating an image file with a resolution compatible with a resolution of the wireless device.

32. The method of claim 30, wherein the visual content comprises a slide presentation.

33. The method of claim 28, wherein the one or more attributes for at least one of the one or more interactive components comprises one or more executable commands.

34. The method of claim 28, wherein the one or more interactive components comprise one or more clickable activities.

35. The method of claim 28, wherein the content file includes a user assessment.

36. The method of claim 34, wherein two or more of the one or more interactive components are grouped into one or more questions.

37. The method of claim 34, wherein at least one of the one or more questions includes one or more question attributes, the one or more question attributes comprising one or more executable commands.

38. The method of claim 34, wherein one or more of the one or more interactive components comprises a clickable activity to be activated by a user of the wireless device when the user assessment has been completed.

39. The method of claim 34, wherein the user assessment includes one or more assessment attributes.

40. The method of claim 34, wherein the user assessment is stored as an XML file.

41. The system of claim 1, wherein the application is one of: a telephone application, a short messaging service (SMS) application, an email application, a web browser application, a media player application and a mapping application.

42. The wireless device of claim 15, wherein the application is one of: a telephone application, a short messaging service (SMS) application, an email application, a web browser application, a media player application and a mapping application.

43. The method of claim 28, wherein the application is one of: a telephone application, a short messaging service (SMS) application, an email application, a web browser application, a media player application and a mapping application.

\* \* \* \* \*